United States Patent
Kim et al.

(10) Patent No.: US 9,582,935 B2
(45) Date of Patent: Feb. 28, 2017

(54) TESSELLATION DEVICE INCLUDING CACHE, METHOD THEREOF, AND SYSTEM INCLUDING THE TESSELLATION DEVICE

(71) Applicant: SAMSUNG ELECTRONICS CO., LTD., Suwon-si, Gyeonggi-do (KR)

(72) Inventors: Seok Hoon Kim, Suwon-si (KR); Chang Hyo Yu, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 265 days.

(21) Appl. No.: 14/321,217

(22) Filed: Jul. 1, 2014

(65) Prior Publication Data

US 2015/0022520 A1   Jan. 22, 2015

(30) Foreign Application Priority Data

Jul. 16, 2013 (KR) .................. 10-2013-0083521

(51) Int. Cl.
*G06T 15/30* (2011.01)
*G06T 17/20* (2006.01)
*G06T 1/60* (2006.01)

(52) U.S. Cl.
CPC ............. *G06T 17/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 5,428,718 A | 6/1995 | Peterson et al. | |
| 6,542,638 B2 | 4/2003 | Campbell | |
| 7,042,452 B1 | 5/2006 | Wasserman et al. | |
| 7,061,500 B1* | 6/2006 | Baldwin | G06T 1/60 345/582 |
| 7,752,590 B1 | 7/2010 | Chyan et al. | |
| 7,903,112 B2 | 3/2011 | Yamada | |
| 7,928,979 B2 | 4/2011 | Patel et al. | |
| 8,248,420 B2 | 8/2012 | Airey et al. | |
| 2002/0135585 A1* | 9/2002 | Dye | G06T 1/60 345/531 |
| 2010/0164955 A1 | 7/2010 | Sathe et al. | |
| 2010/0253683 A1 | 10/2010 | Munkberg et al. | |
| 2011/0069065 A1 | 3/2011 | Hiwada et al. | |
| 2011/0310102 A1 | 12/2011 | Chang | |
| 2012/0229464 A1 | 9/2012 | Fishwick | |
| 2013/0257891 A1* | 10/2013 | Sathe | G06T 17/20 345/589 |
| 2014/0168245 A1* | 6/2014 | Fahs | G06F 13/14 345/533 |

* cited by examiner

Primary Examiner — Peter Hoang
(74) *Attorney, Agent, or Firm* — F. Chau & Associates, LLC (57) ABSTRACT

A tessellation method includes determining whether a previous tag the same as a current tag of a current patch is stored in a cache, and transmitting a previous tessellation pattern corresponding to the previous tag stored in the cache to a domain shader when a cache hit occurs. The method may further include, when a cache miss occurs, generating a current tessellation pattern corresponding to the current patch using a tessellator and transmitting the generated current tessellation pattern to the domain shader, and storing the generated current tessellation pattern in the cache.

20 Claims, 11 Drawing Sheets

TESSELLATION DEVICE INCLUDING CACHE, METHOD THEREOF, AND SYSTEM INCLUDING THE TESSELLATION DEVICE

CROSS-REFERENCE TO RELATED APPLICATIONS

This application claims priority under 35 U.S.C. §119(a) to Korean Patent Application No. 10-2013-0083521 filed on Jul. 16, 2013, the disclosure of which is incorporated by reference in its entirety herein.

BACKGROUND

1. Technical Field

Embodiments of the present inventive concept relate to tessellation using a cache, and more particularly to a tessellation device including a cache, an operation method thereof, and a system including the tessellation device.

2. Discussion of Related Art

Tessellation is the tiling of a plane using one or more geometric shapes, called tiles, with no overlaps and no gaps.

In computer graphics, the term "tessellation" is used to describe the organization of information needed to give the appearance of realistic three-dimensional objects.

A group of control points that define a part of a surface is referred to as a patch. Tessellation factors determine how much to subdivide each patch. For example, the tessellation factors may determine how many tiles the patch will be subdivided into during tessellation. The tessellation converts a low-detail part of a surface into higher-detail primitives in a graphic process. However, since this graphic process is computationally intensive, there is a need to make the process more efficient.

SUMMARY

According to an exemplary embodiment of the present inventive concept, a tessellation method includes: determining whether a previous tag the same as a current tag of a current patch is stored in a cache; and transmitting a previous tessellation pattern corresponding to the previous tag stored in the cache to a domain shader when a cache hit occurs.

According to an exemplary embodiment of the present inventive concept, a tessellation device includes a Hull shader, a domain shader, and a cache processing circuit. The Hull shader generates current tag generation data for a current patch. The cache processing circuit generates a current tag based on the current tag generation data, determines whether a previous tag the same as the current tag is stored in a cache, reads a previous tessellation pattern corresponding to the previous tag from the cache when a cache hit occurs, and transmits the read previous tessellation pattern to the domain shader.

According to an exemplary embodiment of the present inventive concept, a method of managing an operation of a graphics processor unit GPU includes: determining whether a tag based on an output of a hull shading can be retrieved within a threshold time, performing a tessellation to generate a current tessellation pattern CTP and performing a domain shading on the CTP, when it is determined that the tag cannot be retrieved in time, and performing the domain shading on a previous tessellation pattern PTP when it is determined that the tag cannot be retrieved in time.

BRIEF DESCRIPTION OF THE DRAWINGS

The present inventive concept will become apparent and more readily appreciated from the following description of the exemplary embodiments, taken in conjunction with the accompanying drawings of which.

DETAILED DESCRIPTION

The present inventive concept now will be described more fully hereinafter with reference to the accompanying drawings, in which exemplary embodiments of the invention are shown. This invention may, however, be embodied in many different forms and should not be construed as limited to the exemplary embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present.

As used herein, the singular forms "a", "an" and "the" are intended to include the plural forms as well, unless the context clearly indicates otherwise.

Tessellation or a tessellation stage in a graphic pipeline to be described in the present inventive concepts may be embodied in hardware or software.

A current patch is a patch which is a current processing object, and a previous patch is a patch which is processed before the current patch.

A current tag is a tag related to tag generation data of the current patch, a previous tag is a tag related to tag generation data of the previous patch, and the tag generation data include tessellation factors and a patch equation.

Figure 1:
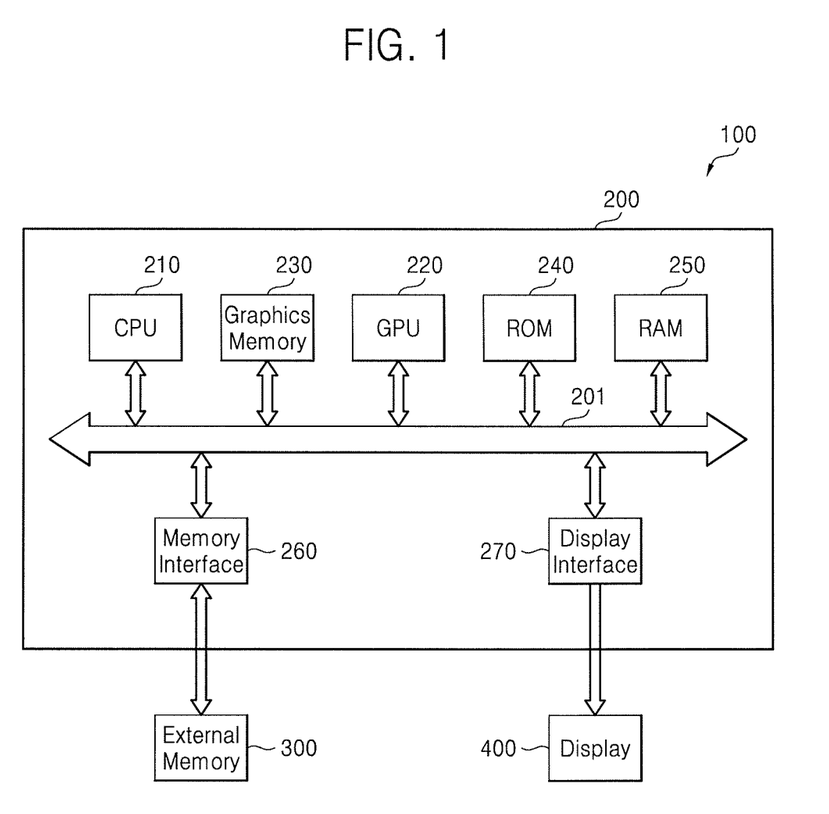
FIG. 1 is a block diagram of an electronic system according to an exemplary embodiment of the present inventive concept.

FIG. 1 is a block diagram of an electronic system 100 according to an exemplary embodiment of the present inventive concept. Referring to FIG. 1, the electronic system 100 may be embodied in a personal computer (PC), a two-dimensional TV, a three-dimensional TV, or a portable electronic device.

The portable electronic device may be embodied in a laptop computer, a smart phone, a tablet PC, a personal digital assistant (PDA), a portable multimedia player (PMP), a handheld game console, or a mobile internet device (MID).

The electronic system 100 includes a processing device 200, an external memory 300, and a display 400.

The processing device 200 may be embodied in a printed circuit board (PCB), a system on chip (SoC), or an application processor.

The processing device 200 includes a central processing unit (CPU) 210, a graphics processing unit (GPU) 220, a graphics memory 230, a non-volatile memory 240, a volatile memory 250, a memory interface 260, and a display interface 270.

In an embodiment, the CPU 210 controls the GPU 220, the graphics memory 230, the non-volatile memory 240, the volatile memory 250, the memory interface 260, and/or the display interface 270 through a bus 201.

In an exemplary embodiment, the CPU 210 executes an application (e.g., a 3D application or a 3D game application).

As the 3D application or the 3D game application is performed or executed, the 3D application or the 3D game application outputs 3D application programming interface (API) commands. A 3D API (e.g., OpenGL™ or Direct3D™, used in applications) may be performed or executed to render 3D computer graphics based on the 3D API commands.

The GPU 220 may be used to process data streams related to computer graphics based on a control of the CPU 210.

Figure 3:
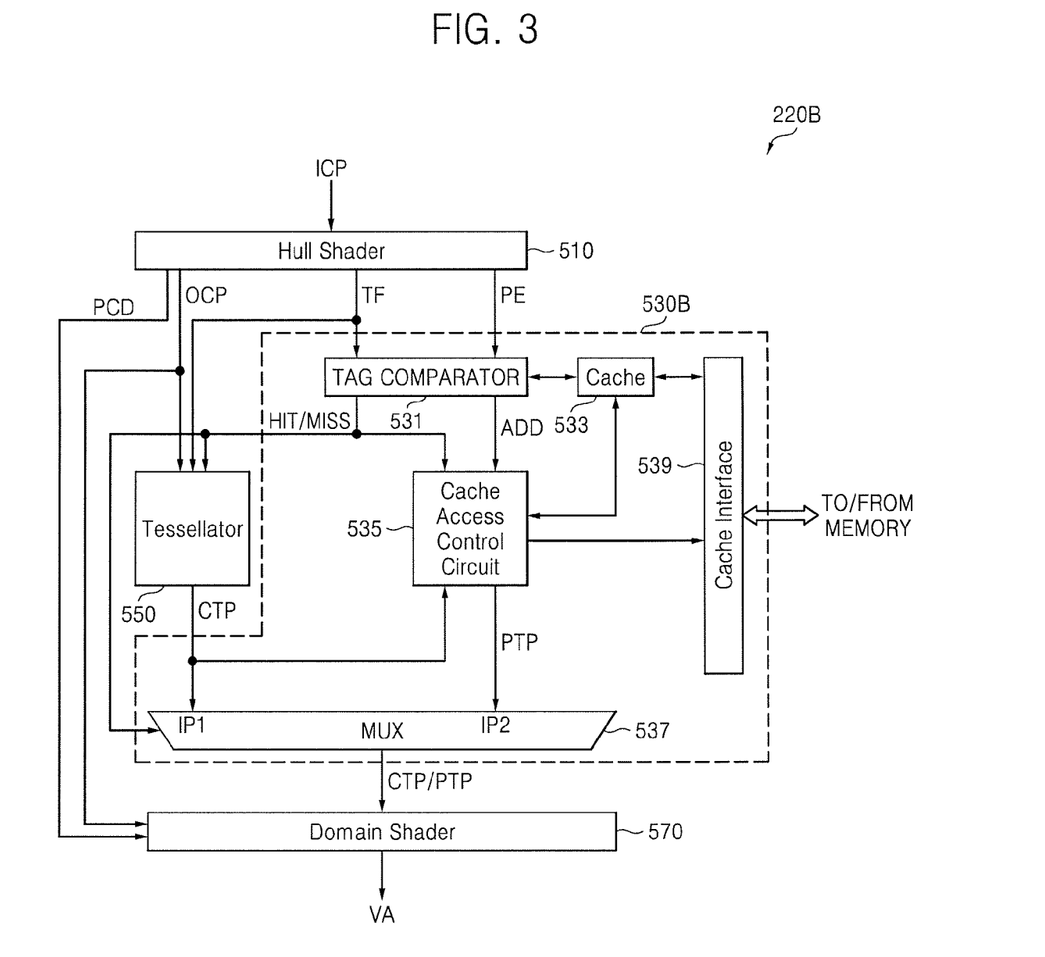
FIG. 3 is a block diagram illustrating the tessellation device illustrated in FIG. 2 according to an exemplary embodiment of the inventive concept.
Figure 5:
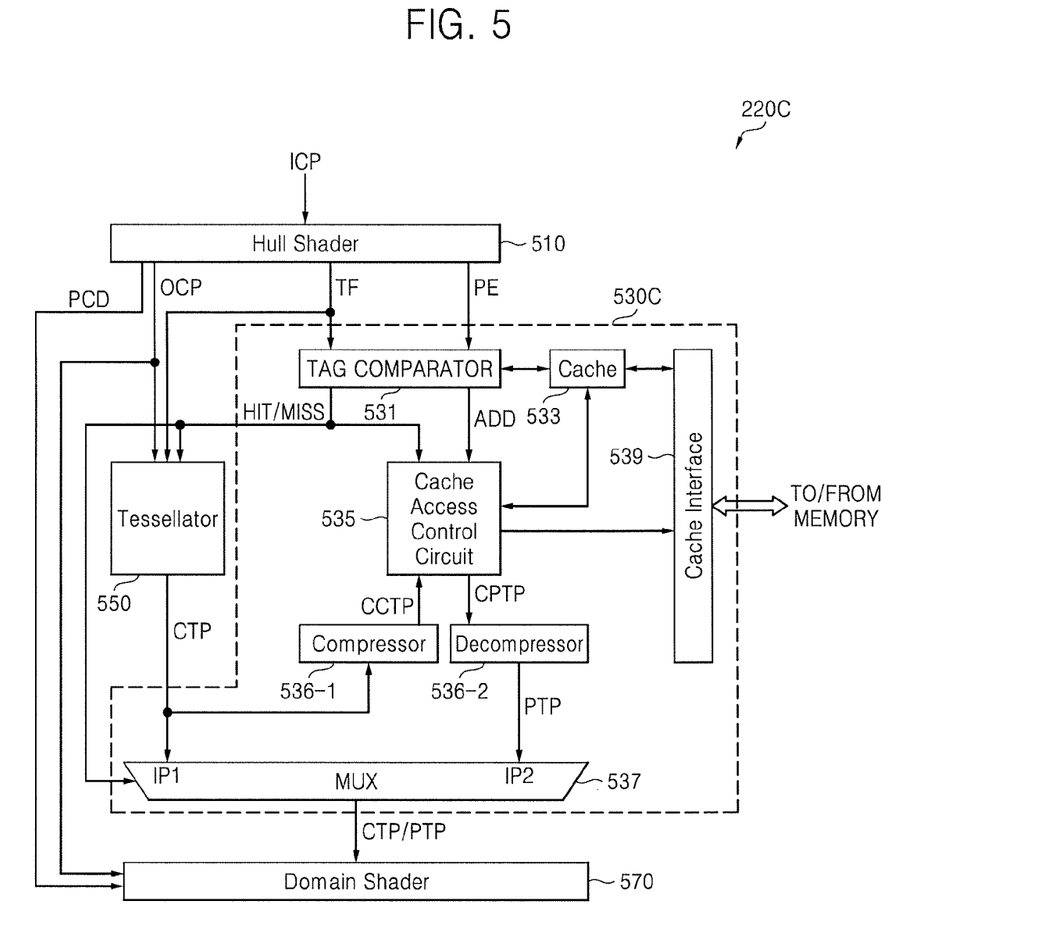
FIG. 5 is a block diagram illustrating the tessellation device illustrated in FIG. 2 according to an exemplary embodiment of the inventive concept.

In an exemplary embodiment, the GPU 220 is a graphics processor including a graphic pipeline with one or more processing stages. The GPU 220 may include a cache 533 as illustrated in FIG. 3 or 5, and selectively operate a tessellator based on whether a previous tag the same as a current tag of a current patch is stored in the cache 533.

The graphics memory 230 may store data to be used in the GPU 220.

The non-volatile memory 240 and the volatile memory 250 may be used as a system memory. The non-volatile memory 240 may be embodied in a read only memory (ROM), and store a basic input/output system (BIOS). The volatile memory 250 may be embodied in a random access memory (RAM), and temporally store data and/or a program (or program module) needed in the GPU 220.

For example, the volatile memory 250 may store an operating system (OS), application programs, other program modules, and program data.

The CPU 210 or the GPU 220 may communicate with an external memory 300 through the memory interface 260.

The external memory 300 may be embodied in a volatile memory or a non-volatile memory. The volatile memory may be embodied in a dynamic random access memory (DRAM), a static random access memory (SRAM), a thyristor RAM (T-RAM), a zero capacitor RAM (Z-RAM), or a Twin Transistor RAM (TTRAM).

The non-volatile memory may be embodied in an Electrically Erasable Programmable Read-Only Memory (EEPROM), a flash memory, a Magnetic RAM (MRAM), a Spin-Transfer Torque MRAM, a Conductive bridging RAM (CBRAM), a Ferroelectric RAM (FeRAM), a Phase change RAM (PRAM), a Resistive RAM (RRAM), a Nanotube RRAM, a Polymer RAM (PoRAM), a Nano Floating Gate Memory (NFGM), a holographic memory, a Molecular electronics Memory Device, or an Insulator Resistance Change Memory.

The external memory 300 may store an operating system (OS), application programs, other program modules, and/or program data. According to a control of the CPU 210, the OS, the application programs, the other program modules, and/or the program data stored in the external memory 300 may be loaded to the volatile memory 250.

The 3D application, the 3D game application, or an API which may perform a tessellation method to be described in at least one embodiment of the present inventive concept stored in the external memory 300 may be loaded to the volatile memory 250.

According to an exemplary embodiment, the external memory 300 is embodied in a hard disk drive (HDD) or a solid state drive (SSD).

According to an exemplary embodiment, the external memory 300 is embodied in a removable storage media or a non-removable storage media. For example, the external memory 300 may be embodied in a universal flash storage (UFS), an embedded multimedia card (eMMC), or a USB flash drive.

The display interface 270 may transmit a computer graphics processed by the CPU 210 or the GPU 220, e.g., 2D data or 3D data, to the display 400. In an exemplary embodiment, the display 400 is embodied in a flat display which displays the computer graphics.

Figure 2:
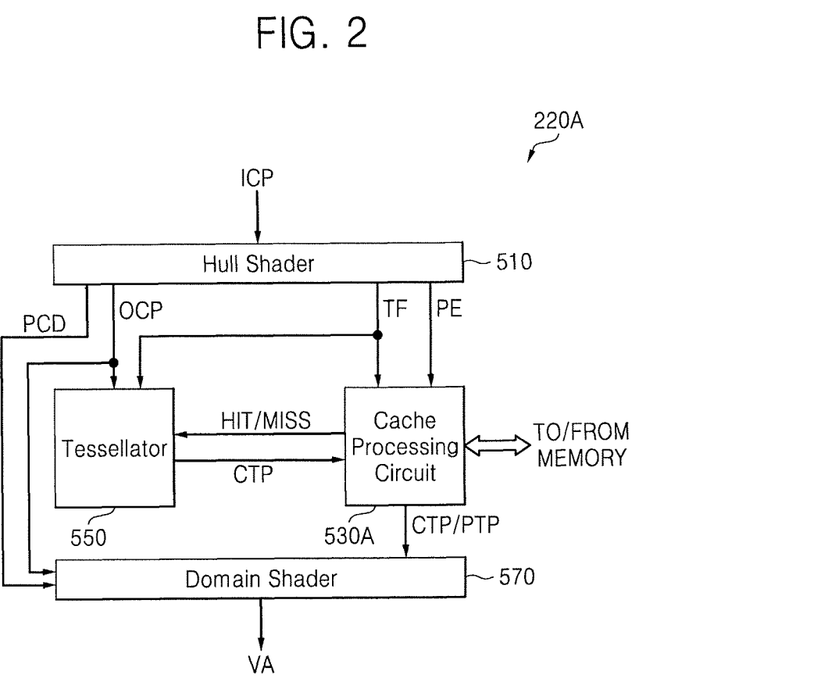
FIG. 2 is a schematic block diagram of a tessellation device included in a graphics processor unit GPU illustrated in FIG. 1 according to an exemplary embodiment of the inventive concept.

FIG. 2 is a schematic block diagram of a tessellation device 220A included in the graphics processor unit 220 illustrated in FIG. 1. Referring to FIGS. 1 and 2, a tessellation device 220A may be called a tessellation, a tessellation stage, or a tessellation pipeline.

In FIGS. 2 to 5, for convenience of description of technical concepts according to an exemplary embodiment of the present inventive concept, only a tessellation device 220A, 220B, or 220C which is related to the tessellation is illustrated among graphic pipelines included in the GPU 220. Accordingly, the tessellation device 220A, 220B, or 220C may be applied or used in various graphic pipelines.

The tessellation device 220A includes a Hull shader 510, a cache processing circuit 530A, a tessellator 550, and a domain shader 570.

A Direct3D™ 11 graphics pipeline adds three graphics pipelines such as the Hull shader, the tessellator, and the domain shader to a Direct3D™ 10 graphics pipeline. Accordingly, each operation of the Hull shader 510, the tessellator 550, and the domain shader 570 except for the cache processing circuit 530A is substantially the same as each operation of the Hull shader, the tessellator, and the domain shader included in the Direct3D™ 11 graphics pipeline.

The Hull shader 510 may receive input points ICP, calculate the tessellation factor TF by (or per) face, edge, or point using the received input points ICP, and assign the calculated tessellation factor TF by (or per) the face, the edge, or the point.

The tessellation factor TF may denote a level of detail (LOD). The tessellation factor TF may be an integer or a decimal fraction.

In an exemplary embodiment, the Hull shader 510 transforms a set of the input points ICP into a set of output points OCP. According to an exemplary embodiment, the number of the input points ICP and the number of the output points OCP may be designed to be equal to each other or different from each other.

The Hull shader 510 may further output a patch equation PE.

The patch equation PE may be a curve equation or a surface equation. For example, the curve equation may be a Hermite curve equation, a Bezier curve equation, a Non-uniform rational B-spline (NURBS) curve equation, or B-spline curve equation.

The Hull shader 510 generates tag generation data related to input points ICP or output points OCP according to programmed criteria. For example, the tag generation data includes a patch equation PE and a tessellation factors TF which are related to the input points ICP or the output points OCP.

The tessellation factors TF may include internal tessellation factors and outer tessellation factors which are independent from each other.

The input points ICP included in a patch may denote input vertices or input control points. The patch may denote a quad patch, a tri patch, or an isoline.

Each of a series (or sequence) of input patches is located close to each other, so that each of the input patches may use the same patch equation and the same tessellation factors. That is, the series of input patches may have the same tessellation patterns. The patch equation may denote a curve equation or a surface equation.

The cache processing circuit 530A determines whether a previous tag the same as a current tag of a current patch to be currently processed is stored in a cache, and when a cache hit occurs according to a result of the determination, outputs a previous tessellation pattern PTP corresponding to the previous patch stored in the cache to the domain shader 570. For example, the cache hit means that the previous tag the same as the current tag is stored in the cache. If the previous tag the same as the current tag is not stored in the cache, then a cache miss has occurred.

Here, the previous tessellation pattern PTP includes UV coordinates (or UVW coordinates) of tessellated points for a previous patch and topology information of the tessellated points. The tessellated points may be referred to as domain points. The letters 'U' and 'V' may denote the axes of a 2D texture when UV mapping is used to project a texture map onto a 3D object. UVW coordinates are used in UVW mapping, which allows texture maps to wrap in complex ways onto irregular surfaces. Each point in a UVW corresponds to a point on a surface.

According to an exemplary embodiment, the previous tessellation pattern PTP further includes output points for the previous patch.

The topology information includes connectivity information of each of the tessellated points. For example, the topology information may indicate which points are connected to one another.

However, when a cache miss occurs according to a result of the determination, the tessellator 550 performs a tessellation operation by using output points OCP for a current patch and tessellation factors TF for the current patch, and generates a current tessellation pattern CTP corresponding to the current patch.

The current tessellation pattern CTP includes UV coordinates (or UVW coordinates) of tessellated points for the current patch and topology information on the tessellated points.

The tessellator 550 outputs the current tessellation pattern CTP to the domain shader 570 through the cache processing circuit 530A. The current tessellation pattern CTP may be stored in a cache of the cache processing circuit 530A.

According to an exemplary embodiment, the current tessellation pattern CTP further includes output points OCP for a current patch.

The tessellation device 220A according to an exemplary embodiment of the present inventive concept skips an operation of the tessellator 550 based on repetitiveness of the current tag of the current patch. For example, if a previous tag is the same as the current tag, it is likely that similar output points OCP and tessellation factors TF were already previously processed by the tessellator 550, and thus there would be no need to have tessellator 550 process the current output points and tessellation factors TF. Accordingly, the tessellation workload of the tessellator 550 may be reduced.

The domain shader 570 generates and outputs attributes VA of vertices or locations VA of vertices using outputs OCP and patch constant data PCD of the Hull shader 510 and an output PTP or CTP of a cache processing circuit 530A.

For example, the domain shader 570 may calculate surface geometry or tessellated vertices using output points OCP, patch constant data PCD, and an output PTP or CTP of the cache processing circuit 530A.

The patch constant data PCD may include tessellation factors TF, coefficients related to the patch equation PE, and/or user-defined values.

Figure 4A:
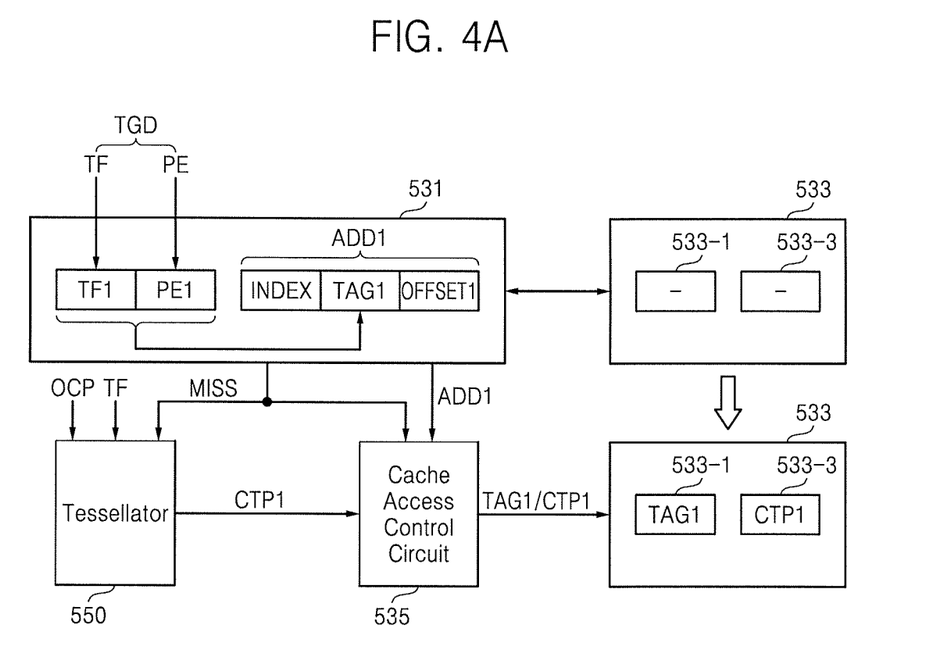
FIG. 4A is a conceptual diagram for describing an exemplary operation of the tessellation device of FIG. 3 when a cache miss occurs.
Figure 4B:
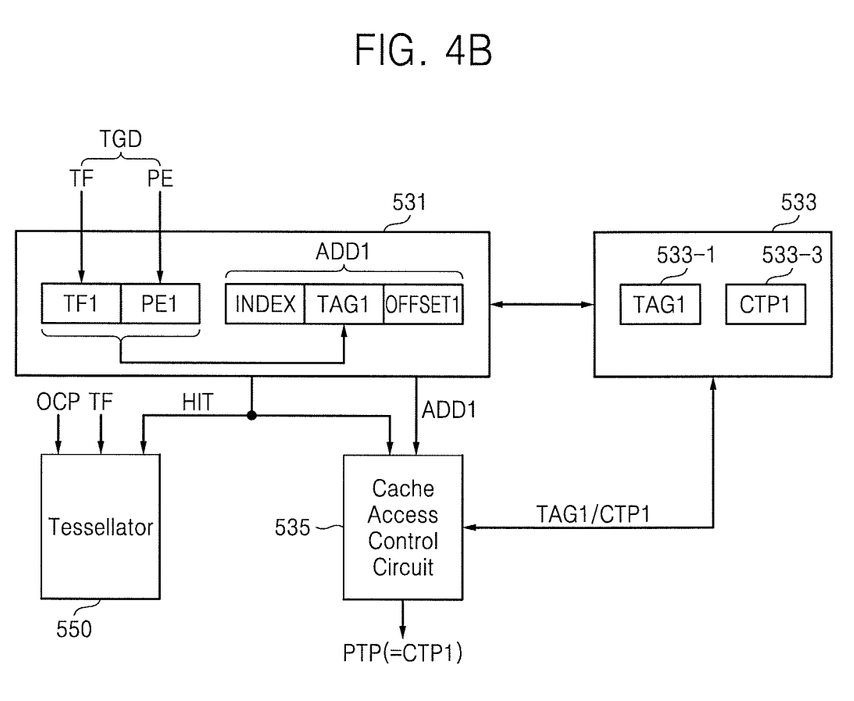
FIG. 4B is a conceptual diagram for describing an exemplary operation of the tessellation device of FIG. 3 when a cache hit occurs.

FIG. 3 is a block diagram depicting an exemplary embodiment of the tessellation device illustrated in FIG. 2, FIG. 4A is a conceptual diagram for describing an exemplary operation of the tessellation device of FIG. 3 when a cache miss MISS occurs, and FIG. 4B is a conceptual diagram for describing an exemplary operation of the tessellation device of FIG. 3 when a cache hit HIT occurs.

Referring to FIGS. 2 to 4B, a tessellation device 220B according to an exemplary embodiment of the tessellation device 220A illustrated in FIG. 2 includes the Hull shader 510, the cache processing circuit 530B, the tessellator 550, and the domain shader 570.

The cache processing circuit 530B includes a tag comparator 531, a cache 533, a cache access control circuit 535, a selector 537, and a cache interface 539.

Referring to FIGS. 3 and 4A, the hull shader 510 outputs tessellation factors TF (e.g., TF1) and the patch equation PE (e.g., PE1) for a first patch, e.g., a current patch, to the tag comparator 531. Tag generation data TGD for the first patch includes the tessellation factors TF (e.g., TF1) and the patch equation PE (e.g., PE1).

The tag comparator 531 generates an address ADD1 using the tag generation data TGD. For example, the address ADD1 may include an index INDEX, a first tag TAG1, and a first offset OFFSET1. That is, the first tag TAG1 may be defined or generated based on the tag generation data TGD. The tag comparator 531 determines whether a tag corresponding to the first tag TAG1 is stored in a tag cache 533-1 of the cache 533.

According to a result of the determination, when the tag corresponding to the first tag TAG1 is not stored in the tag cache 533-1 of the cache 533, the tag comparator 531 transmits an indication signal indicating a cache miss MISS to the cache access control circuit 535 and the tessellator 550, and transmits the address ADD1 to the cache access control circuit 535.

The tessellator 550 performs a tessellation operation using output points OCP for the first patch and tessellation factors TF for the first patch, generates a current tessellation pattern CTP1 corresponding to the first patch based on a result of the tessellation operation, and transmits the current tessellation pattern CTP1 to the cache access control circuit 535.

The cache access control circuit 535 transmits the current tessellation pattern CTP1 to the cache 533 based on the address ADD1. Accordingly, the first tag TAG1 is stored in the tag cache 533-1, and the current tessellation pattern CTP1 is stored in a data cache 533-3.

Referring to FIGS. 3 and 4B, the Hull shader 510 outputs tessellation factors TF (e.g., TF1) and a patch equation PE (e.g., PE1) for a second patch, e.g., a current patch, to the tag comparator 531.

Tag generation data TGD for the second patch includes the tessellation factors TF (e.g., TF1) and the patch equation PE (e.g., PE1). When the first patch and the second patch are adjacent to each other, the tag generation data TGD for each of the first patch and the second patch may be the same as each other.

The tag comparator 531 generates the address ADD1 using the tag generation data TGD. For example, the address ADD1 may include an index INDEX, the first tag TAG1, and a first offset OFFSET1. That is, the first tag TAG1 may be defined or generated based on the tag generation data TGD. The tag comparator 531 determines whether a tag corresponding to the first tag TAG1 is stored in the tag cache 533-1 of the cache 533.

According to a result of the determination, when the tag TAG1 corresponding to the first tag TAG1 is stored in the tag cache 533-1 of the cache 533, the tag comparator 531 transmits an indication signal indicating a cache hit HIT to the cache access control circuit 535 and the tessellator 550, and transmits the address ADD1 to the cache access control circuit 535.

The cache access control circuit 535, based on the first tag TAG1 included in the address ADD1 and the indication signal, reads a previous tessellation pattern CTP1 corresponding to the first patch, e.g., a previous patch, from the data cache 533-3 and outputs the read previous tessellation pattern CTP1 to the selector 537.

Here, the tessellator 550 does not perform a tessellation operation on the second patch based on the indication signal indicating a cache hit HIT.

Figure 6:
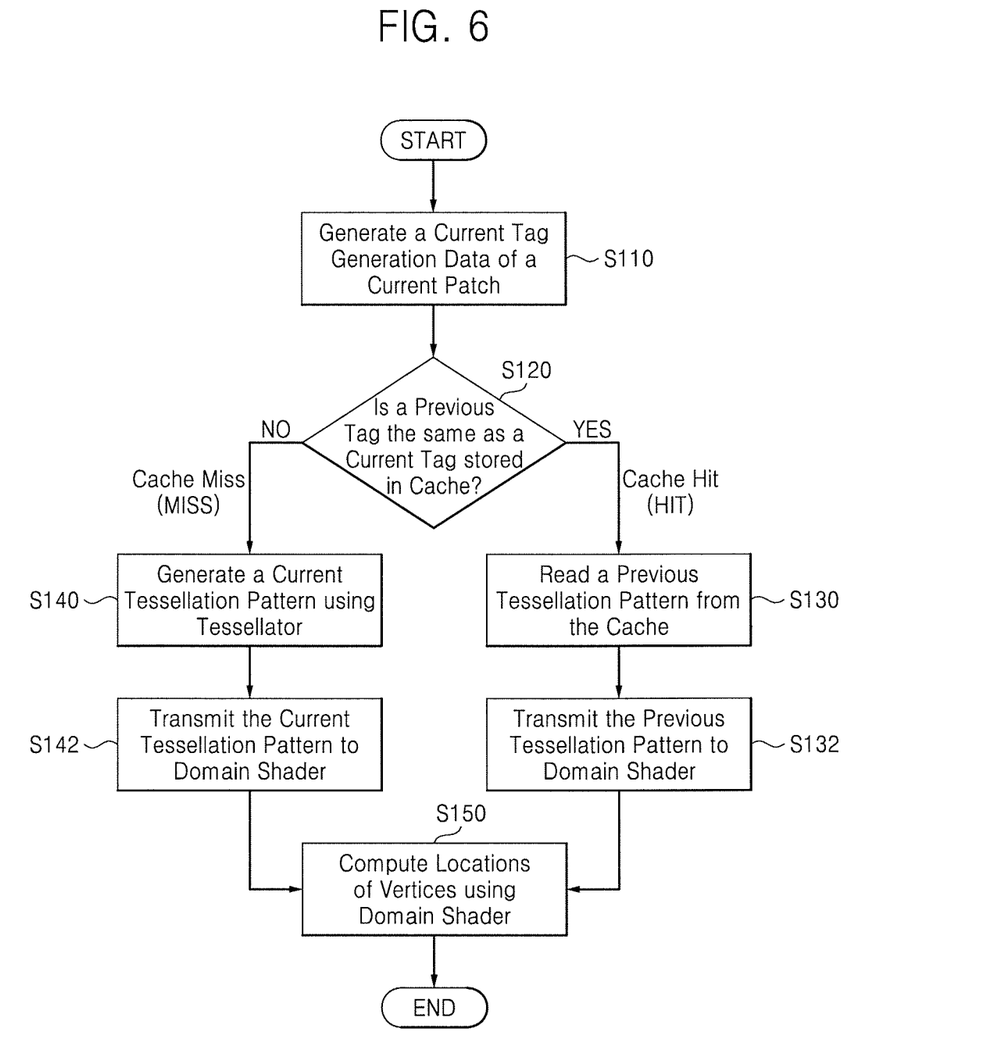
FIG. 6 is a flowchart for describing a tessellation method according to an exemplary embodiment of the present inventive concept when a previous tag the same as a current tag is not stored in a cache and a memory.

FIG. 6 is a flowchart for describing a tessellation method according to an exemplary embodiment of the present inventive concept when a previous tag the same as a current tag is not stored in the cache 533 and the memory 230 or 300.

Referring to FIGS. 1 to 4B, and 6, the Hull shader 510 generates current tag generation data TGD of a current patch including input points ICP (S110). As described above, the current tag generation data TGD includes the patch equation PE and tessellation factors TF.

The tag comparator 531 compares tags, and determines whether a previous tag the same as a current tag of the current patch is stored in the cache 533 and the memory 230 or 300 (S120).

The tag comparator 531 receives the patch equation PE related to a current patch and the tessellation factors TF related to a current patch, generates a current tag using the patch equation PE and the tessellation factors TF, compares the current tag with each of previous tags, and generates an indication signal indicating a cache hit HIT or a cache miss MISS based on a result of the comparison.

Here, each of the previous tags is generated based on tag generation data related to each of previous patches, i.e., a patch equation and tessellation factors.

A tag cache 533-1 of the cache 533 stores each of the previous tags. In addition, the data cache 533-3 of the cache 533 stores a previous tessellation pattern corresponding to each of the previous tags.

The cache 533 may store a previous tessellation pattern corresponding to each of the previous tags transmitted from the memory 230 or 300 through a cache interface 539.

The tag comparator 531 outputs an address ADD to the cache access control circuit 535. The address ADD is an address needed to access a previous tessellation pattern stored in the cache 533. For example, the address ADD may be an address including a current tag of a current patch.

The tag comparator 531 outputs an indication signal indicating a cache hit HIT or a cache miss MISS to the cache access control circuit 535, the selector 537, and the tessellator 550.

When a result of the comparison in step S120 is a cache hit HIT, an operation of the cache processing circuit 530B is as follows.

The cache access control circuit 535 is enabled in response to an indication signal indicating a cache hit HIT, the enabled cache access control circuit 535, using an address ADD including a current tag, reads a previous tessellation pattern PTP corresponding to the current tag from the data cache 533-3 of the cache 533 (S130), and transmits the read previous tessellation pattern PTP to a second input port IP2 of the selector 537.

The tessellator 550 may be disabled in response to an indication signal indicating a cache hit HIT. The selector 537 outputs the previous tessellation pattern PTP input to the second input port IP2 of the selector 537 to the domain shader 570 (S132).

The domain shader 570 may calculate a location of each vertex in response to the previous tessellation pattern PTP output from the cache access control circuit 535 and outputs OCP and PCD from the Hull shader 510 (S150).

When the result of the comparison in step S120 is a cache miss MISS, an operation of the cache processing circuit 530B is as follows.

It is assumed that a previous tag the same as a current tag of a current patch is not present in both the cache 533 and the memory 230 or 300.

The tessellator 550 is enabled in response to an indication signal indicating a cache miss MISS.

The tessellator 550 receives output points OCP for a current patch and tessellation factors TF for the current patch, performs a tessellation operation using the output points OCP and the tessellation factors TF, generates a current tessellation pattern CTP corresponding to the current patch based on a result of the tessellation operation (S140), and transmits the current tessellation pattern CTP to a first input port IP1 of the selector 537.

The tessellator 550 transmits the current tessellation pattern CTP to the cache access control circuit 535, and the cache access control circuit 535 stores the tessellation pattern CTP in the cache 533.

For example, the cache access control circuit 535 may store the current tessellation pattern CTP in the cache 533 using an address ADD including a current tag generated based on the patch equation PE and the tessellation factors TF of the current patch.

The selector 537 outputs the current tessellation pattern CTP input to the first input port IP1 to the domain shader 537 in response to an indication signal indicating a cache miss MISS (S142).

The domain shader 537 calculates a location of each vertex using the outputs OCP and PCD output from the Hull shader 510 and the current tessellation pattern CTP (S150).

Figure 7:
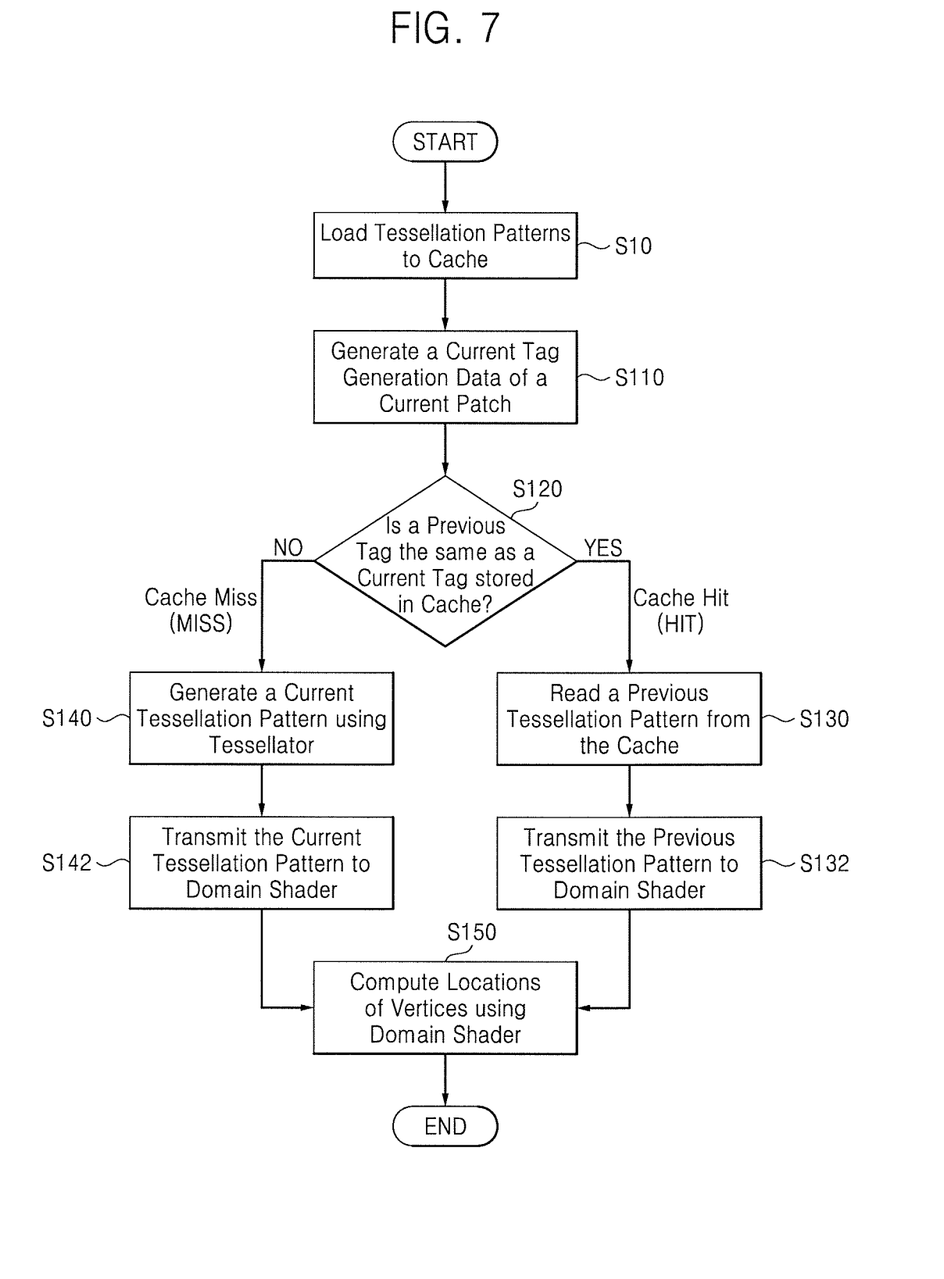
FIG. 7 is a flowchart for describing a tessellation method according to an exemplary embodiment of the present inventive concept.

FIG. 7 is a flowchart for describing a tessellation method according to an exemplary embodiment of the present inventive concept.

A tessellation pattern for each patch may be generated by a tessellation device 220A, 220B, or 220C in real time (or on-the-fly) and stored in the cache 533.

As illustrated in FIG. 7, tessellation patterns for each patch may be generated in advance and loaded from the memory 230 or 300 to the cache 533 through the cache interface 539 at an appropriate timing (S10). For example, the tessellation pattern for each patch may be generated by a user, e.g., a manufacturer or programmer, and stored in the memory 230 or 300.

The appropriate timing may be determined according to a design specification of the tessellation device 220A, 220B, or 220C. For example, when a compulsory miss or a cold miss occurs, a tessellation pattern for each patch may be loaded to the cache 533. The tessellation pattern for each patch may be stored in the external memory 300.

Figure 8:
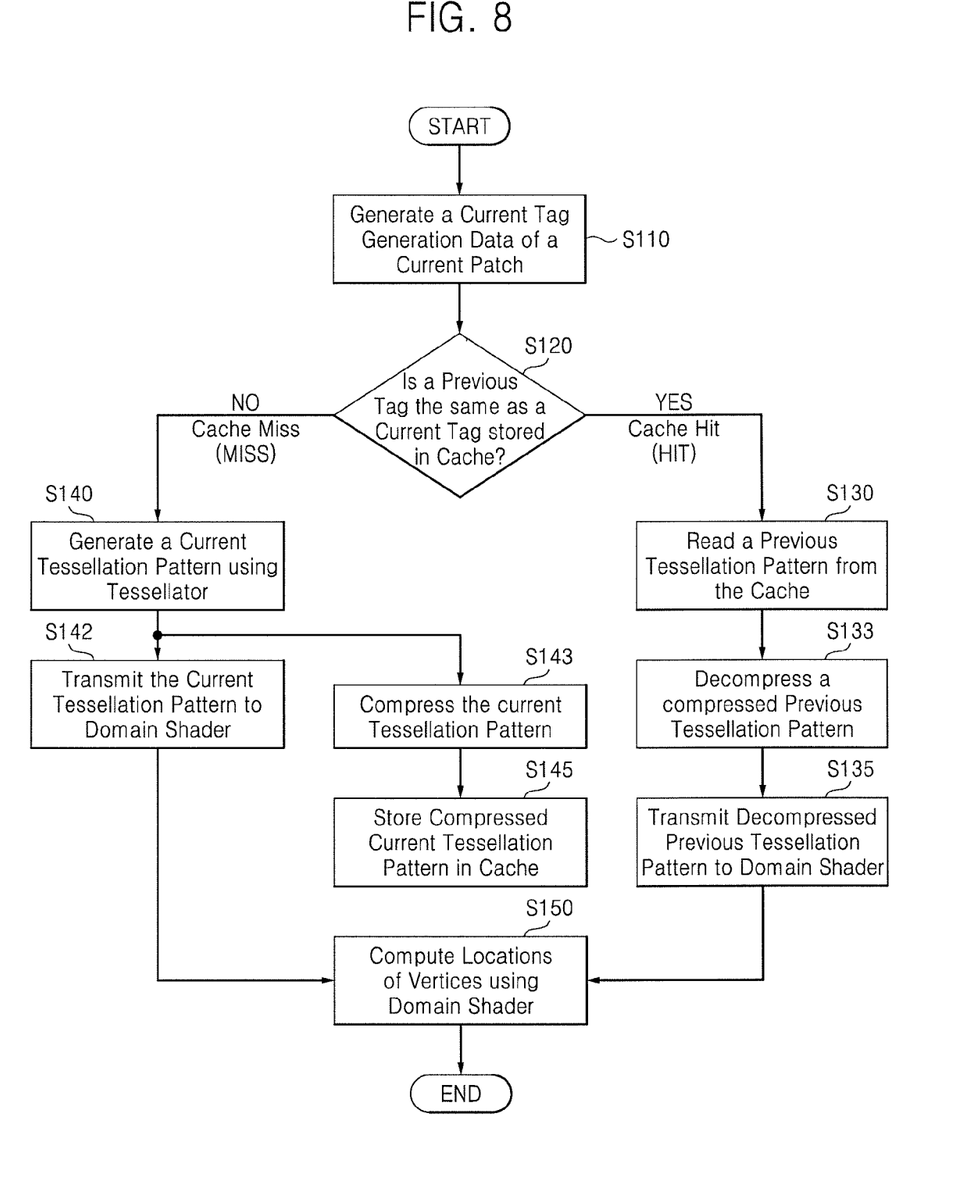
FIG. 8 is a flowchart for describing a tessellation method according to an exemplary embodiment of the present inventive concept when the previous tag the same as the current tag is not stored in the cache and the memory.

FIG. 5 is a block diagram illustrating an exemplary embodiment of the tessellation device illustrated in FIG. 2, and FIG. 8 is a flowchart for describing the tessellation method according to an exemplary example embodiment of the present inventive concept when a previous tag the same as a current tag is not stored in both the cache and the memory.

Referring to FIGS. 2 and 5, the tessellation device 220C according to an exemplary embodiment of the tessellation device 220A of FIG. 2 includes the Hull shader 510, the cache processing circuit 530C, tessellator 550 and the domain shader 570.

The cache processing circuit 530C includes a tag comparator 531, a cache 533, a cache access control circuit 535, a compressor 536-1, a de-compressor 536-2, a selector 537, and a cache interface 539.

Referring to FIGS. 1 to 4B, 5, and 8, the Hull shader 510 generates current tag generation data of a current patch including input points ICP (S110).

The tag comparator 531 compares tags, and determines whether the previous tag the same as the current tag of the current patch is stored in the cache 533 according to a result of the comparison (S120). As described above, the current tag may be defined by tag generation data of the current patch, and the previous tag may be defined by tag generation data of a previous patch.

The tag comparator 531 receives the patch equation PE related to the current patch and the tessellation factors TF related to the current patch, generates a current tag using the patch equation PE and the tessellation factors TF, compares the current tag with each of previous tags, and generates an indication signal indicating a cache hit HIT or a cache miss MISS based on a result of the comparison.

When a result of the comparison in step S120 is cache hit HIT, an operation of the cache processing circuit 530C is as follows.

The cache access control circuit 535 is enabled in response to an indication signal indicating a cache hit HIT, and the enabled cache access control circuit 535, in response to an address ADD including a current tag, reads a compressed previous tessellation pattern CPTP which corresponds to the current tag from the cache 533, and transmits the compressed previous tessellation pattern CPTP to the de-compressor 536-2 (S130).

The de-compressor 536-2 de-compresses the compressed previous tessellation pattern CPTP, and transmits the de-compressed previous tessellation pattern PTP to a second input port IP2 of the selector 537 (S133). The tessellator 550 may be disabled in response to an indication signal indicating a cache hit HIT.

The selector 537 outputs the de-compressed previous tessellation pattern PTP input to the second input port IP2 to the domain shader 570 in response to an indication signal indicating a cache hit HIT (S135). The domain shader 570 calculates a location of each vertex using the de-compressed previous tessellation pattern PTP and outputs OCP and PCD of the Hull shader 510 (S150).

When a result of the comparison in step S120 is a cache miss MISS, an operation of the cache processing circuit 530C is as follows.

The tessellator 550 is enabled in response to an indication signal indicating a cache miss MISS.

The tessellator 550 receives output points OCP for a current patch and tessellation factors TF for the current patch, performs a tessellation operation using the output points OCP and the tessellation factors TF, generates a current tessellation pattern CTP corresponding to the current patch based on a result of the tessellation operation, and transmits the current tessellation patch CTP to a first input port IP1 of the selector 537 (S140).

Here, the tessellator 550 transmits the current tessellation pattern CTP to a compressor 536-1, the compressor 536-1 compresses the current tessellation pattern CTP, and transmits the compressed current tessellation pattern CCTP to the cache access control circuit 535 (S143).

The cache access control circuit 535 stores the compressed current tessellation pattern CCTP in the cache 533 using the address ADD (S145). Here, the cache access control circuit 535 may store the compressed current tessellation pattern CCTP in the cache 533 using the address ADD including a current tag generated based on the patch equation PE related to a current patch and the tessellation factor TF related to the current patch (S145).

The selector 537 outputs the current tessellation pattern CTP input to the first input port IP1 to the domain shader 570 in response to an indication signal indicating a cache miss MISS (S142). The domain shader 537 calculates a location of each vertex using the outputs OCP and PCD of the Hull shader 510 and the current tessellation pattern CTP output from the tessellator 550 (S150).

Figure 9:
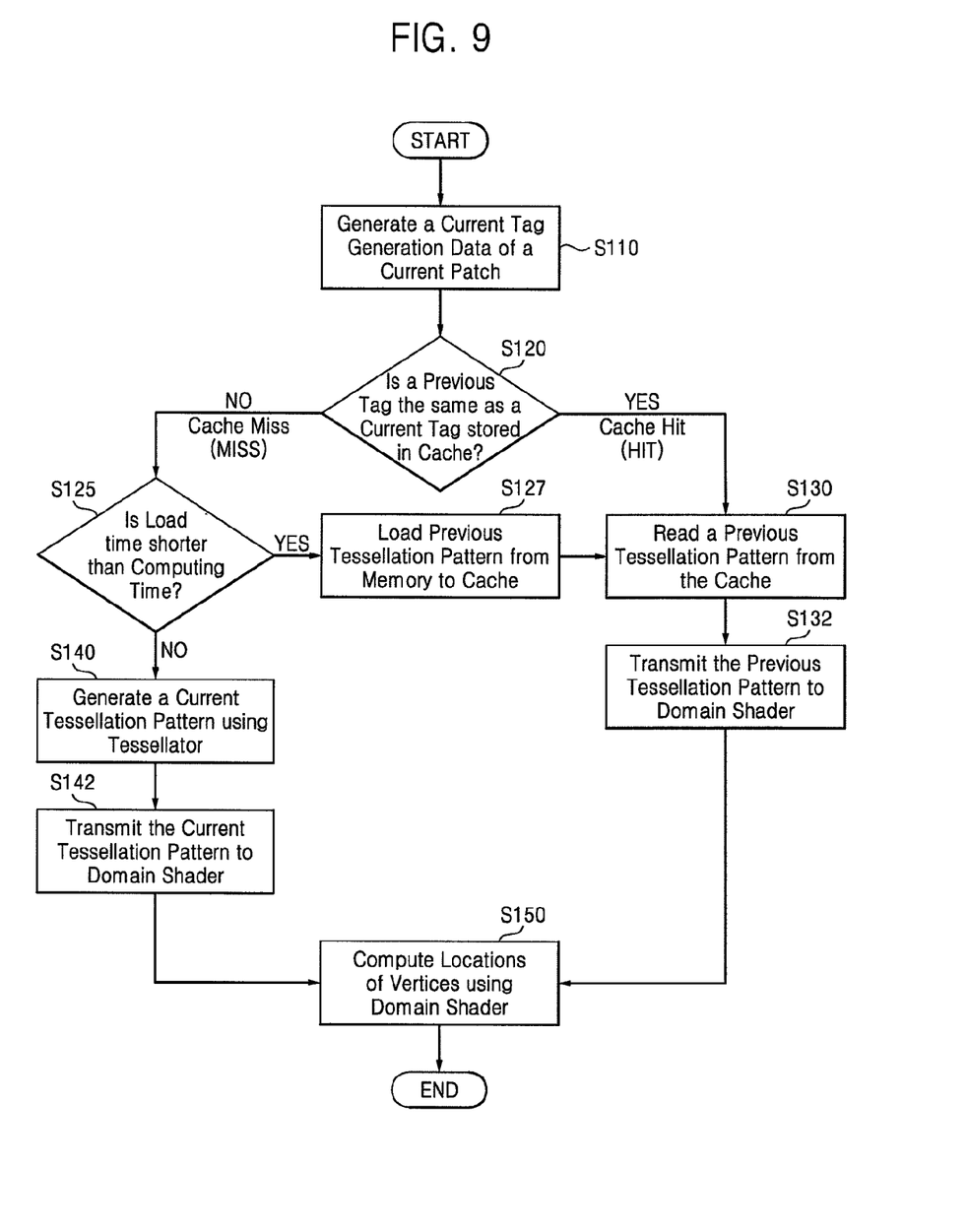
FIG. 9 is a flowchart for describing a tessellation method according to an exemplary embodiment of the present inventive concept when the previous tag the same as the current tag is stored only in the memory.

FIG. 9 is a flowchart for describing a tessellation method according to an exemplary embodiment of the present inventive concept when a previous tag the same as a current tag is stored only in a memory.

When a previous tag the same as a current tag of a current patch is not stored in the cache 533 but stored only in the memory 230 or 300, a cache miss MISS may occur. When the cache miss occurs, one of the tag comparator 531, the cache 533, and the cache access control circuit 535 compares a load time with a computing time (S125).

According to an exemplary embodiment, a comparison algorithm in which the load time is compared with the computing time is embodied in the tag comparator 531, the cache 533, or the cache access control circuit 535.

The load time is an amount of time consumed in loading a previous tessellation pattern corresponding to a previous patch from the memory 230 or 300 to the cache 533, and the computing time is an amount of time consumed in generating a current tessellation pattern corresponding to a current patch or a current tag.

When the load time is shorter than the computing time, according to a control of the comparison algorithm, the cache interface 539 loads a previous tessellation pattern corresponding to a previous patch from the memory 230 or 300 to the cache 533 (S127).

When a cache hit HIT occurs, the cache access control circuit 535, in response to the address ADD including a current tag, reads the previous tessellation pattern PTP loaded in the cache 533 (S130), and transmits the previous tessellation pattern PTP to the domain shader 570 through the selector 537 (S132).

However, when the load time is longer than the computing time, the tessellator 550 performs a tessellation operation using output points OCP for a current patch and tessellation factors TF for the current patch, generates a current tessellation pattern CTP corresponding to the current patch according to a result of the tessellation operation (S140), and transmits the current tessellation pattern CTP to the domain shader 570 through the selector 537 (S142).

Figure 10:
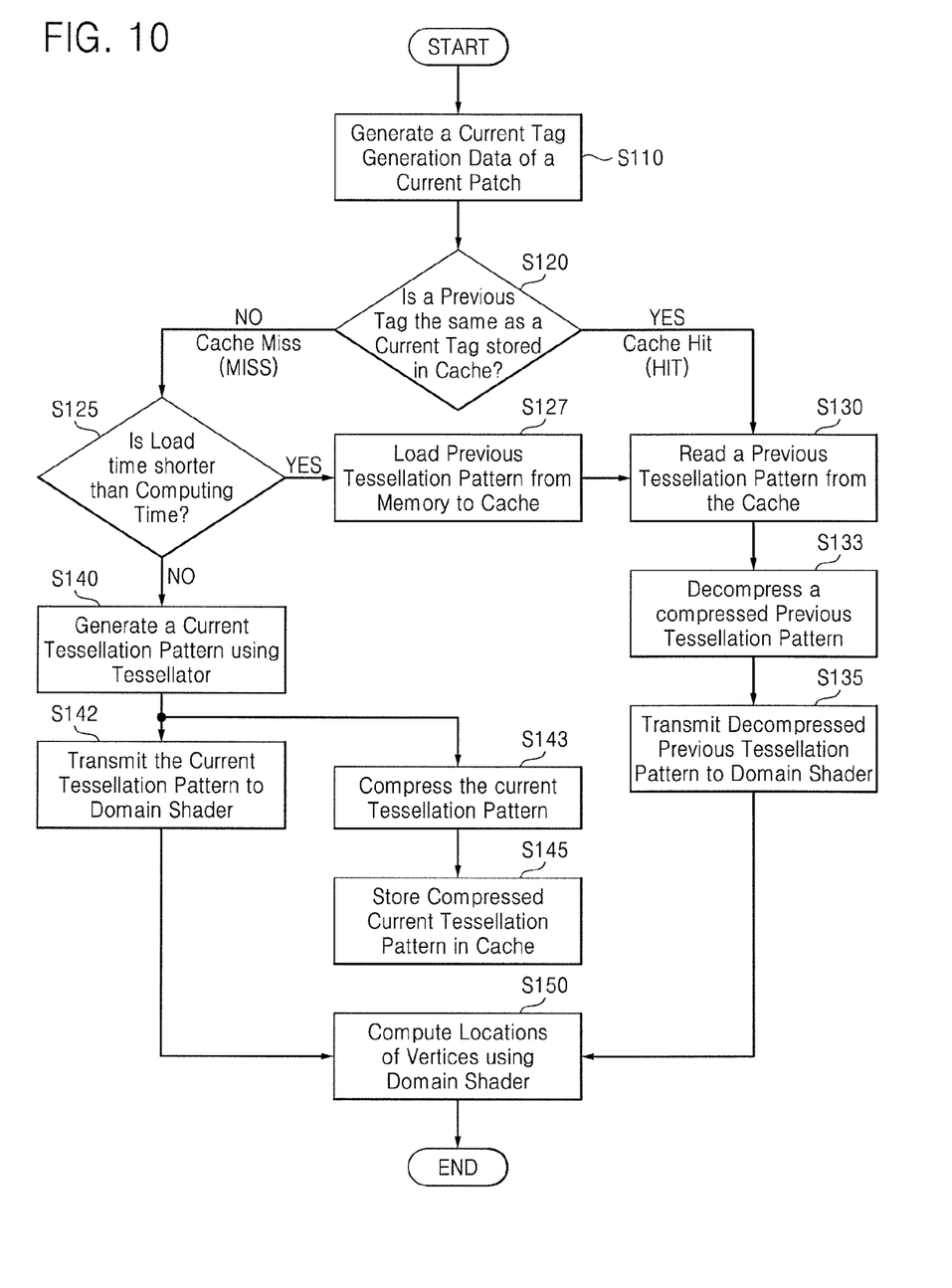
FIG. 10 is a flowchart for describing a tessellation method according to an exemplary embodiment of the present inventive concept when the previous tag the same as the current tag is stored only in the memory.

FIG. 10 is a flowchart for describing a tessellation method according to an exemplary embodiment of the present inventive concept when a previous tag the same as a current tag is stored only in a memory.

When a previous tag the same as a current tag of a current patch is not stored in the cache 533, but stored only in the memory 230 or 300, a cache miss MISS may occur.

Referring to FIGS. 5, and 8 to 10, when the load time is longer than the computing time (S125), a tessellation operation of generating a current tessellation pattern CTP corresponding to a current patch is performed by the tessellator 550 (S140), a compression operation of the current tessellation pattern CTP using the compressor 536-1 is performed (S143), and the compressed current tessellation pattern CCTP is stored in the cache 533 by the cache access control circuit 535 (S145).

A tessellation device including a cache according to an exemplary embodiment of the present inventive concept may reduce a tessellation workload by selectively skipping an operation of a tessellator. Accordingly, power consumption of the tessellation device may be reduced.

According to an exemplary embodiment, a method of managing an operation of a GPU (e.g., 220) includes: determining whether a tag based on an output of a hull shading can be retrieved within a threshold time. For example, the output of the hull shading may be generated by a hull shader 510 and include tessellation factors TF and a patch equation PE. In an exemplary embodiment, it can be determined that the tag can be retrieved within the threshold time when a cache (e.g., 533) of the GPU stores the tag. In an exemplary embodiment, it can be determined that the tag can be retrieved within the threshold time when the tag is present within a memory external to the cache (e.g., external memory 300 or graphics memory 230), the tag is not present within the cache, and an estimated time to load the tag from the memory to the cache is within the threshold time. In an exemplary embodiment, it is determined that the tag cannot be retrieved within the time when the tag is not present in the cache or the estimated time to load the tag from the memory to the cache exceeds the threshold time.

At least one embodiment of the inventive concept can be embodied as computer-readable codes having computer executable instructions on a non-transitory computer-readable medium. For example, the operations of FIGS. 6-10 may be embodied as computer executable instructions. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

While the present inventive concepts have been particularly shown and described with reference to exemplary embodiments thereof, it will be understood by those of ordinary skill in the art that various changes in forms and details may be made therein without departing from the spirit and scope of the present inventive concepts.

What is claimed is:

1. A tessellation method comprising:
determining a cache hit occurs when a previous tag of a previous patch stored in a cache is the same as a current tag of a current patch and that a cache miss occurs when the previous tag is not the same as the current tag;
transmitting a previous tessellation pattern corresponding to the previous tag stored in the cache to a domain shader when the cache hit occurs; and
performing, by a graphics processing unit, a tessellation operation on the current patch to generate a current tessellation pattern for output to the domain shader when the cache miss occurs.

2. The tessellation method of claim 1, wherein the determining is performed according to a result of comparing the current tag, generated based on a patch equation and a tessellation factor of the current patch, with the previous tag, generated based on a patch equation and a tessellation factor of a previous patch.

3. The tessellation method of claim 1, wherein the transmitting de-compresses the previous tessellation, pattern and transmits the de-compressed previous tessellation pattern to the domain shader.

4. The tessellation method of claim 1, further comprising storing the generated current tessellation pattern in the cache.

5. The tessellation method of claim 4, wherein each of the previous tessellation pattern and the current tessellation pattern comprises UV coordinates of tessellated points and topology information of the tessellated points.

6. The tessellation method of claim 1, further comprising:
loading, when a cache miss occurs, the previous tessellation pattern from a memory to the cache; and
transmitting the previous tessellation pattern loaded to the cache to the domain shader.

7. The tessellation method of claim 1, further comprising:
compressing the generated current tessellation pattern using a compressor and storing the compressed current tessellation pattern in the cache.

8. The tessellation method of claim 1, further comprising:
comparing a load time consumed in loading the previous tessellation pattern from a memory to the cache with a computing time consumed in generating the current tessellation pattern corresponding to the current patch when the cache miss occurs;
transmitting the generated current tessellation pattern to the domain shader when the computing time is shorter than the load time; and
storing the generated current tessellation pattern in the cache.

9. The tessellation method of claim 1, further comprising:
comparing a load time consumed in loading the previous tessellation pattern from a memory to the cache with a computing time consumed in generating the current tessellation pattern corresponding to the current patch when the cache miss occurs;

transmitting the generated current tessellation pattern to the domain shader when the computing time is shorter than the load time; and compressing the generated current tessellation pattern and storing the compressed current tessellation pattern in the cache.

10. A non-transitory computer-readable recording medium comprising a graphics application programming interface (API) which instructs a graphics processor to perform the method of claim 1.

11. A tessellation device comprising:
a Hull shader which generates current tag generation data for a current patch;
a domain shader; and
a cache processing circuit which generates a current tag based on the current tag generation data, determines a cache hit occurs when a previous tag of a previous patch stored in a cache is the same as the current tag and that a cache miss occurs when the previous tag is not the same as the current tag, reads a previous tessellation pattern corresponding to the previous tag from the cache when the cache hit occurs, and transmits the read previous tessellation pattern to the domain shader,
wherein a graphics processing unit of the tessellation device performs a tessellation operation on the current patch to generate a current tessellation pattern for output to the domain shader when the cache miss occurs.

12. The tessellation device of claim 11,
wherein the cache processing circuit transmits the current tessellation pattern to the domain shader and stores the current tessellation pattern in the cache.

13. The tessellation device of claim 12, wherein the cache processing circuit, when the cache miss occurs, compares a load time consumed in loading the previous tessellation pattern from a memory to the cache with a computing time consumed in generating the current tessellation pattern,
wherein, when the computing time is shorter than the load time, the tessellator generates the current tessellation pattern.

14. The tessellation device of claim 12, wherein the cache processing circuit comprises:
a tag comparator which compares the current tag, generated based on a patch equation and a tessellation factor of the current patch, with the previous tag, generated based on a patch equation and a tessellation factor of a previous patch, and generates an indication signal indicating the cache hit or the cache miss according to a result of the comparison;
a cache access control circuit which reads the previous tessellation pattern from the cache based on an address related to the current tag; and
a selector which outputs the previous tessellation pattern or Rail the current tessellation pattern of the current patch to the domain shader in response to the indication signal.

15. The tessellation device of claim 14, wherein the cache processing circuit further comprises:
a de-compressor which de-compresses the previous tessellation pattern output from the cache access control circuit and outputs the de-compressed previous tessellation pattern to the selector; and
a compressor which compresses the current tessellation pattern and outputs the compressed tessellation pattern to the cache access control circuit for storage in the cache.

16. A method of managing an operation of a graphics processor unit GPU, the method comprising:
determining whether a tag based on an output of a hull shading can be retrieved within a threshold time;
performing a tessellation to generate a current tessellation pattern CTP and performing a domain shading on the CTP, when it is determined that the tag cannot be retrieved in time; and
performing the domain shading on a previous tessellation pattern PTP when it is determined that the tag cannot be retrieved in time.

17. The method of claim 16, wherein the determining determines that the tag can be retrieved within the threshold time when a cache of the GPU stores the tag.

18. The method of claim 16, wherein the determining determines that the tag can be retrieved within the time when a memory external to the GPU stores the tag and an estimated time to load the to from the memory to a cache of the GPU is within the threshold time.

19. The method of claim 16, wherein the determining determines that the tag cannot be retrieved within the time when the tag is not present within a cache of the GPU.

20. The method of claim 16, wherein the determining determines that the tag cannot be retrieved within the time when a memory external to the GPU stores the tag and an estimated time to load the tag from the memory to a cache of the GPU exceeds the threshold time.

* * * * *